(12) United States Patent
Chen

(10) Patent No.: US 8,333,440 B2
(45) Date of Patent: Dec. 18, 2012

(54) WHEEL DEVICE FOR CARRIER

(75) Inventor: Shun-Min Chen, Taipei Hsien (TW)

(73) Assignee: Kenny Cheng, Taipei (TW)

( * ) Notice: Subject to any disclaimer, the term of this patent is extended or adjusted under 35 U.S.C. 154(b) by 2716 days.

(21) Appl. No.: 10/440,786

(22) Filed: May 19, 2003

(65) Prior Publication Data

US 2011/0084545 A1    Apr. 14, 2011

(30) Foreign Application Priority Data

Jul. 17, 2002    (CN) .............................. 02 2 42069 U

(51) Int. Cl.
*B60B 27/02*    (2006.01)
(52) U.S. Cl. ................ 301/111.04; 301/111.01; 301/121
(58) Field of Classification Search ............. 301/111.01, 301/112, 121–122, 111.04, 111.07
See application file for complete search history.

(56) References Cited

U.S. PATENT DOCUMENTS

| 1,540,508 | A | * | 6/1925 | White | 301/112 |
| 4,043,685 | A | * | 8/1977 | Hyams | 403/19 |
| 5,716,107 | A | * | 2/1998 | Parker et al. | 301/111.07 |
| 5,902,018 | A | * | 5/1999 | Owen et al. | 301/111.04 |
| 6,099,083 | A | * | 8/2000 | Logan | 301/111.01 |
| 6,354,670 | B1 | * | 3/2002 | Cheng | 301/111.04 |
| 6,578,931 | B1 | * | 6/2003 | Anderson | 301/111.01 |

* cited by examiner

*Primary Examiner* — Jason Bellinger
(74) *Attorney, Agent, or Firm* — Gesmer Updegrove LLP

(57) ABSTRACT

A wheel device for a carrier comprises a wheel, a shaft, a clipping fastener and a cover. The shaft passes through the wheel and has a channel at one end. The clipping fastener has a plurality of radially curved claws inwardly extending from an outer portion thereof and the claws are engaged into the channel to pivotally secure the wheel around the shaft. The cover has a connecting structure such as a snap-fit at an inner surface thereof for engaging with the clipping fastener.

11 Claims, 4 Drawing Sheets

WHEEL DEVICE FOR CARRIER

PRIORITY

The present application claims priority to Chinese Patent Application No. 02242069.X filed Jul. 17, 2002.

FIELD OF THE INVENTION

The present invention relates generally to a wheel device for a carrier, and more particularly to a wheel device for a stroller having claws and connecting structures.

BACKGROUND OF THE INVENTION

Recently, there have been many improvements in stroller design. Lighter weight of the whole structure of the stroller, safety during using it, and small volume of it after collapsing have all become focuses to be improved, and the emphasized points that are particularly put on are the material of the frames, collapsing structure, safety fastener, braking structure, and damping design etc. of the stroller. Due to the above improvements, the weight is lighter, the volume is smaller, safety is enhanced, and comfort is significantly upgraded in the present stroller. However, such improvements inevitably and largely increase the cost of manufacturing a stroller and add cost to consumers.

Importantly, there is seldom improvement about the wheel device per se in the prior art. However, the wheel device plays a vital role in the stroller operation because the stroller must be apt to move on different roads. Even if the road is uneven, the wheels are by no means allowed to be separated from the stroller. Besides, the smoothly rolling of the wheels must be taken into consideration at the same time, that is, the fixation of the wheels should not affect their smoothly rolling.

SUMMARY OF THE INVENTION

Through long term research, it has been found that the wheels are seldom released after being assembled and thus firmly fixing the wheels around the shafts preempts the other topics when the above safety factors are taken into consideration.

Accordingly, the present invention relates to a wheel device for a carrier that can substantially obviate one or more of the problems due to the limitations and disadvantages of the related arts.

One object of the present invention is the provision of a wheel device for a carrier which can firmly and pivotally fix the wheels around the shafts.

Another object of the present invention is to provide a wheel device for a carrier which permits user easily mounting the wheels around the shafts.

A further object of the present invention is to provide a wheel device for a carrier whose manufacture cost is considerably lower than that of the prior art.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a wheel device for a carrier comprises a wheel, a shaft, a clipping fastener and a cover. The shaft passes through the wheel and has a channel at one end. The clipping fastener has a plurality of radical curved claws inwardly extending from an outer portion thereof and the claws are engaged into the channel to pivotally secure the wheel around the shaft. The cover has a connecting structure at an inner surface thereof for engaging with the clipping fastener.

It is preferred that the clipping fastener of the wheel device for the carrier is made of flexible material with high strength.

Alternatively, the connecting structure of the wheel device for the carrier is formed by an ultrasonic molding or press molding and is constructed in the manner that the clipping fastener can be snapped over the connecting structure in a mechanical way.

Advantageously, the connecting structure is a snap-fit.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

The term of 'carrier' comprises stroller, perambulator, push car, vehicle and the like.

Figure 1:
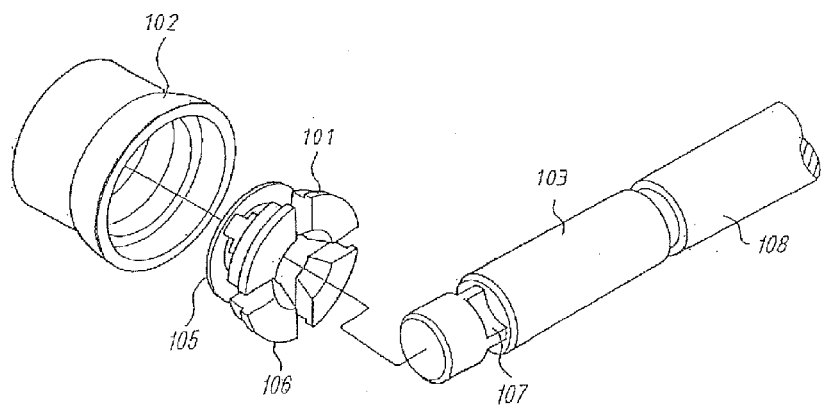
FIG. 1 is an exploded perspective view illustrating a conventional wheel device.

FIG. 1 illustrates a conventional wheel device comprising a cap 102, a fastener 101 and a mounting portion 103. The cap 102 and the fastener 101 are made of plastic material with flexibility. The mounting portion 103 is a part of a rod 108 at one end thereof.

The fastener 101 comprises a ring base 105 and four grasping portions 106 flexibly connected at one side of the ring base 105. The diameter of a hole defined by the four grasping portions 106 can be enlarged or reduced by the aid of the flexibility. When a wheel is first installed around the mounting portion 103, then the fastener 101 is set at the end of the mounting portion 103. At this time, the four grasping portions 106 are respectively snapped into the recesses 107 provided at the outer end of the mounting portion 103 so as to secure the wheel around the rod 108. Next, the cap 102 is disposed around the fastener 101 to protect it and be of sense of beauty.

The above conventional wheel device has the following deficiencies. First, the fastener 101 must be made of plastic steel material with high strength, of which cost in the respect of molding and material is relatively high. Secondly, In spite of using plastic steel material with high strength, however, due to being abutted by the wheel for a long time, the fastener 101 still has the possibility of being damaged and further affects the safety of the stroller operation.

Figure 2:
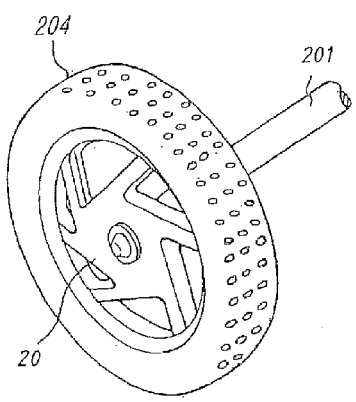
FIG. 2 is an assembled perspective view of the wheel device for a carrier according the present invention.

With reference to FIG. 2, the wheel 204 is disposed around one end of the shaft 201 and then the wheel-secured means 20 of the present invention is installed at the end of the shaft 201.

Figure 3:
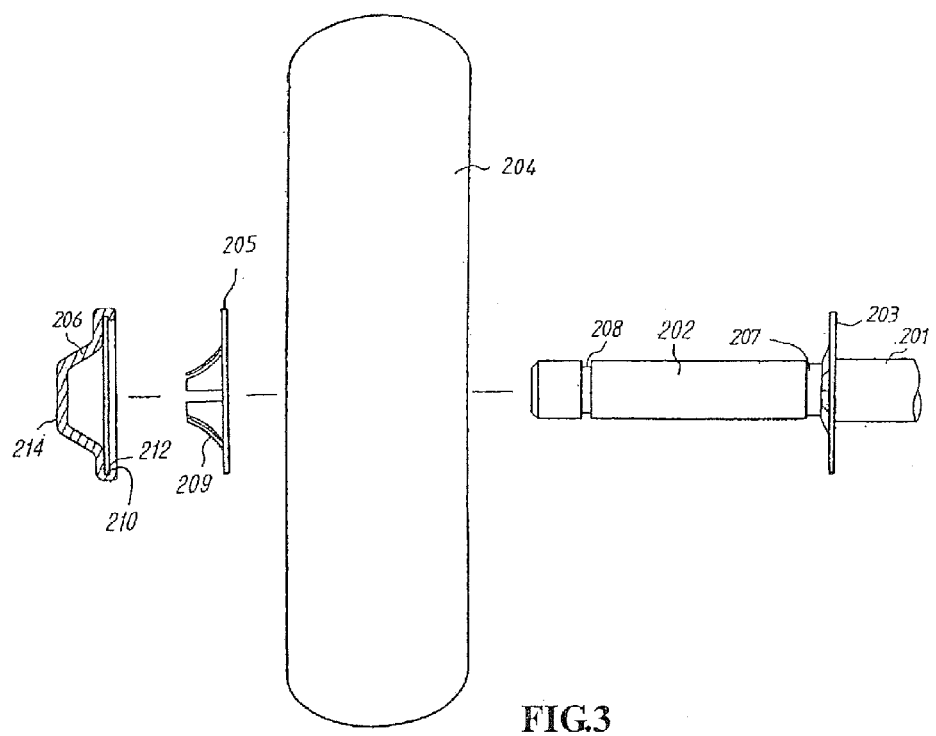
FIG. 3 is an exploded plane view of the wheel device for a carrier according the present invention.

With reference to FIG. 3, a clipping stopper 203 is interposed between a bearing portion 202, for supporting the wheel 204, and the shaft 201. The clipping stopper 203 is engaged around the shaft 201 to prevent the wheel from shifting rightward (inner side of a stroller). A cover 206 is installed on a clipping fastener 205 to enhance the safety protection. The length of the bearing portion 202 is larger than the width of the wheel 204 to a predetermined quantity, such as 0.5 mm, in order to permit the wheel 204 moving laterally a little bit and at the same time not to affect the stability of rolling of the wheel 204.

Figure 4:
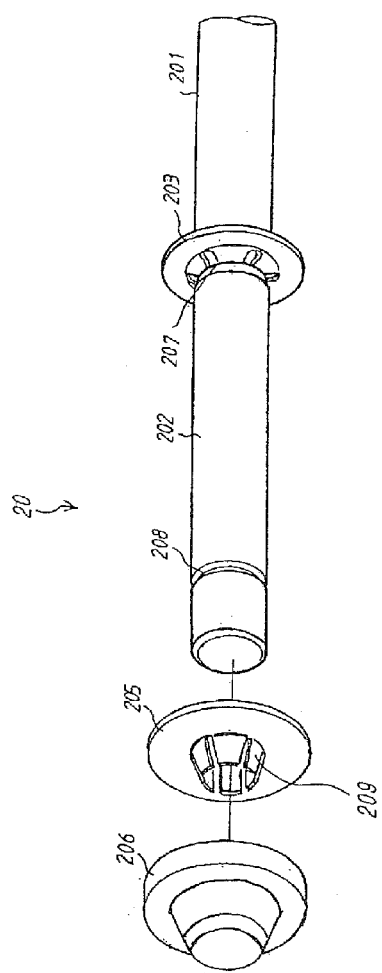
FIG. 4 is an exploded perspective view of the wheel device for a carrier according the present invention.

With reference to FIG. 4, the wheel-secured means 20 according to the present invention comprises a bearing portion 202 situated at one end of the shaft 201, a clipping stopper 203 engaged into an inner cylindrical channel 207 interposed between the bearing portion 202 and the shaft 201, a clipping fastener 205 engaged into an outer cylindrical channel 208 situated at left end of the bearing portion 202 and having a plurality of radially curved claws 209 inwardly extending from an outer portion thereof, and a cover 206 engaged with the clipping fastener 205 at the outer portion.

Figure 6:
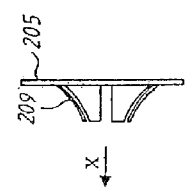
FIG. 6 is a side view of the clipping fastener of the wheel device for a carrier according the present invention.
Figure 5:
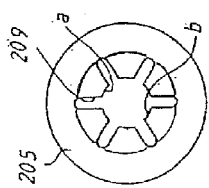
FIG. 5 is a front view of the clipping fastener of the wheel device for a carrier according the present invention.

As shown in FIG. 5 and FIG. 6, the clipping fastener 205 is formed by cutting the central part of a circular steel sheet into a plurality of claws and then curving and deforming the claws in the direction of X axis. The clipping fastener 205 is preferably made of flexible steel material, such as stainless steel, to avoid the claws 209 being broken during forming processes. As shown in FIG. 5, the distance between the ends a, b of two opposite claws 209 is smaller than the diameter of outer cylindrical channel 208. The preferred fitting size is that the former is from two third to three fourth of the later. Due to the relation in size, when clipping fastener 205 is bushed around the bearing portion 202 along the X direction, the claws 209 will snap into the outer cylindrical channel 208 by the restoration force thereof and exert the bearing portion 202 a grasping force to fix the clipping fastener 205 in the outer cylindrical channel 208.

Figure 7:
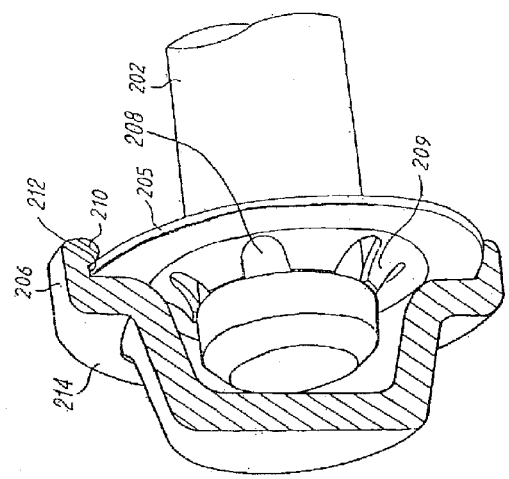
FIG. 7 is a partial cross-sectional and assembled perspective view of the wheel device for a carrier according the present invention

As illustrated in FIG. 7, the cover 206 comprises a cup body 214, a snap-fit 210 formed at an opening end of the cup body 214 by an ultrasonic molding or press molding, and a ringed groove 212 defined between the cup body 214 and the snap-fit 210 for accommodating the clipping fastener 205. Besides, the snap-fit 210, connecting structure, is constructed in the manner that the outer portion of clipping fastener 205 can be snapped into the ringed groove 212 in a mechanical way. However, the cover 206 still can be separated from the clipping fastener 205 if necessary.

Alternatively, the cover 206 comprises a screw (not shown) as the connecting structure at the inner surface thereof instead of the snap-fit 210 and ringed groove 212 for engaging with the outer portion of clipping fastener.

The mounting of the cover 206 to the clipping fastener 205 along X direction (shown in FIG. 6) is generally before the mounting of the clipping fastener 205 to the bearing portion 202; however, the converse processes is also possible in particular case.

On the other hand, the material used and the structure according to the present invention are very simple. What is needed is only the flexible material, for example stainless steel, and a plastic cover 206. Therefore, the wheel-secured means 20 of the present invention can achieve the fixation of easily mounting and uneasily separating in low cost.

Furthermore, because the wheel-secured means 20 of the present invention is made of material with high strength, such as stainless steel, the wheel 204 can be firmly fixed around the bearing portion 202 and the possibility of the wheel 204 accidentally separating from the bearing portion 202 is reduced to the most.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A wheel device for a carrier, comprising:
   a wheel;
   a shaft passing through the wheel and having a channel at one end;
   a clipping fastener having a plurality of radially curved claws inwardly extending from an outer potion of the clipping fastener, the claws being engaged into the channel to pivotally secure the wheel around the shaft; and
   a cover having a connecting structure at an inner surface of the cover for engaging with the clipping fastener, said connecting structure including a ringed groove on an inner surface of the cover for engaging an outer rim of the clipping fastener.

2. The wheel device for the carrier as claimed in claim 1, wherein the clipping fastener is made of flexible material.

3. The wheel device for the carrier as claimed in claim 1, wherein the connecting structure is formed by an ultrasonic molding or press molding and is constructed in the manner that the clipping fastener can be snapped over the connecting structure in a mechanical way.

4. The wheel device for the carrier as claimed in claim 1, wherein the connecting structure is a snap-fit.

5. A wheel device for a carrier, comprising:
   a wheel;
   a shaft passing through the wheel and having a channel at one end;
   a ring-shaped clipping fastener having a plurality of radial claws inwardly extending from a circumference of the clipping fastener, and the claws being engaged with the channel to pivotally secure the wheel on the shaft; and
   a connecting structure including a ringed groove on an inner surface of a cover for engaging an outer rim of the clipping fastener.

6. The wheel device for the carrier as claimed in claim 5, wherein the clipping fastener is made of metal.

7. The wheel device for the carrier as claimed in claim 5, wherein the connecting structure is formed by an ultrasonic molding or press molding and is constructed in the manner that the clipping fastener can be snapped over the connecting structure in a mechanical way.

8. The wheel device for the carrier as claimed in claim 5, a distance between ends of opposite two of the claws is smaller than a diameter of the channel.

9. A clipping fastener for pivotally securing a wheel on a shaft, the clipping fastener comprising:
   a plurality of radial claws inwardly extending from an outer portion of the clipping fastener,
   wherein a distance between ends of opposite two of the claws is smaller than a diameter of a channel of the shaft so that ends of the claws will grasp the channel and fix the clipping fastener on the shaft; and wherein a connecting structure includes a ringed groove on an inner surface of a cover for engaging an outer rim of the clipping fastener.

10. The clipping fastener as claimed in claim 9, wherein the clipping fastener is made of metal.

11. The clipping fastener as claimed in claim 9, wherein the clipping fastener is formed in a ring shape and the plurality of claws radially and inwardly extend from a circumference of the clipping fastener.

* * * * *